(12) United States Patent
Takamura

(10) Patent No.: US 10,584,240 B2
(45) Date of Patent: Mar. 10, 2020

(54) POLY(PHENYLENE ETHER) COMPOSITION, METHOD OF FORMING SAME, AND ARTICLES PREPARED THEREFROM

(71) Applicant: SABIC GLOBAL TECHNOLOGIES B.V., Bergen op Zoom (NL)

(72) Inventor: Norihiro Takamura, Tochigi (JP)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/754,462

(22) PCT Filed: Aug. 3, 2016

(86) PCT No.: PCT/IB2016/054697
§ 371 (c)(1),
(2) Date: Feb. 22, 2018

(87) PCT Pub. No.: WO2017/033080
PCT Pub. Date: Mar. 2, 2017

(65) Prior Publication Data
US 2018/0291200 A1    Oct. 11, 2018

Related U.S. Application Data

(60) Provisional application No. 62/304,446, filed on Mar. 7, 2016, provisional application No. 62/210,476, filed on Aug. 27, 2015.

(51) Int. Cl.
| | | |
|---|---|---|
| *C08L 71/12* | (2006.01) | |
| *C08L 83/00* | (2006.01) | |
| *C08K 5/521* | (2006.01) | |
| *C08L 55/02* | (2006.01) | |
| *C08J 3/22* | (2006.01) | |
| *C08L 25/10* | (2006.01) | |
| *H01M 2/10* | (2006.01) | |
| *C08L 51/04* | (2006.01) | |

(52) U.S. Cl.
CPC ............ *C08L 71/123* (2013.01); *C08J 3/223* (2013.01); *C08K 5/521* (2013.01); *C08L 25/10* (2013.01); *C08L 55/02* (2013.01); *C08L 71/12* (2013.01); *C08L 83/00* (2013.01); *H01M 2/1072* (2013.01); *C08J 2325/10* (2013.01); *C08J 2371/12* (2013.01); *C08J 2409/06* (2013.01); *C08J 2425/10* (2013.01); *C08J 2471/12* (2013.01); *C08J 2483/04* (2013.01); *C08L 51/04* (2013.01); *C08L 2201/02* (2013.01); *C08L 2205/025* (2013.01); *C08L 2205/03* (2013.01); *C08L 2205/035* (2013.01); *H01M 2220/10* (2013.01)

(58) Field of Classification Search
CPC ........ C08L 71/12; C08L 71/123; C08L 71/03; C08L 25/10; C08L 55/02; C08L 83/00; C08J 3/223; H01M 2/1072
See application file for complete search history.

(56) References Cited

U.S. PATENT DOCUMENTS

| | | |
|---|---|---|
| 5,428,106 A | 6/1995 | Schrader et al. |
| 8,322,476 B2 | 12/2012 | Komaki |
| 2004/0063824 A1 | 4/2004 | Takagi et al. |
| 2005/0004296 A1 | 1/2005 | Geck et al. |
| 2010/0249294 A1 | 9/2010 | Culligan |
| 2012/0298548 A1 | 11/2012 | Riding |

FOREIGN PATENT DOCUMENTS

| | | |
|---|---|---|
| CN | 102702722 A | 10/2012 |
| EP | 2042223 A1 | 4/2009 |
| JP | H07224192 | 8/1995 |
| JP | 1997279045 | 10/1997 |
| JP | H10045920 A | 2/1998 |
| JP | H11189690 A | 7/1999 |
| JP | 2000281907 | 10/2000 |
| JP | 2004244537 A | 9/2004 |
| JP | 2010031283 A | 2/2010 |

OTHER PUBLICATIONS

Machine translation of JP 11-189690. Original document date Jul. 1999.*
"The Formation of butyl-rubber modified polystyrene", Materials Letters (1995). (Year: 1995).*
International Search Report for International Application No. PCT/IB2016/054697; International Filing Date Aug. 3, 2016; dated Oct. 21, 2016; 4 pages.
Written Opinion for International Application No. PCT/IB2016/054697; International Filing Date Aug. 3, 2016; dated Oct. 21, 2016; 7 pages.

* cited by examiner

*Primary Examiner* — Edward J Cain
(74) *Attorney, Agent, or Firm* — Cantor Colburn LLP

(57) ABSTRACT

A composition includes specific amounts of a poly(phenylene ether), a rubber-modified polystyrene, a flame retardant containing an organophosphate ester, and a mold release agent containing a high viscosity polydiorganosiloxane. The composition excludes polyolefin waxes. The high viscosity polydiorganosiloxane can be provided in the form of a room temperature solid masterbatch, thereby facilitating compounding of the composition. The composition is useful for injection molding, and particularly useful for injection molding battery holders for cell phone tower back-up power systems.

19 Claims, 2 Drawing Sheets

POLY(PHENYLENE ETHER) COMPOSITION, METHOD OF FORMING SAME, AND ARTICLES PREPARED THEREFROM

CROSS-REFERENCE TO RELATED APPLICATIONS

This application is a National Stage application of PCT/IB2016/054697, filed Aug. 3, 2016, which claims the benefit of U.S. Provisional Application Nos. 62/210,476, filed Aug. 27, 2015, and 62/304,446, filed Mar. 7, 2016, each of which are incorporated by reference herein in their entirety.

BACKGROUND OF THE INVENTION

Cell phone towers and hospitals, police stations, military installations and other facilities require back-up power systems, sometimes referred to as uninterruptible power supplies. These systems are used during power interruptions, such as those associated with storms and earthquakes. These back-up power supplies typically utilize arrays of lithium batteries. Lithium batteries are also used to store solar-generated power for use at night. The lithium battery arrays can include over one hundred cylinder-shaped batteries held in a single, honeycomb-shaped plastic holder with thin walls separating the battery cylinders. The length and width of the holder are specified in the IEC standard, but the depth of the holder is not regulated. The current design of the holder consists of three parts which are top, middle spacer, and bottom. Since the height of typical cylindrical lithium battery is 65 millimeters, the depth of each holder part could be around 20 millimeters. The holder with this design is easier to mold than a one-part or two-part holder, but it is more difficult to assemble, and defects such as cracks can be created during assembly. There is therefore a desire for a battery holder that improves the assembling process.

To resolve the problems at the assembling process, two-part holder designs have been considered. However, compared three-part holder designs, the draft angle of each hole must be sharper and the surface area to contact with the mold tool is larger. This leads to difficulty ejecting the molded part from the mold, and it can also increase the incidence of defects caused by molding. There therefore remains a need for molding compositions that facilitate the molding of two-part battery holders with small draft angles and large areas of contact with the mold.

BRIEF SUMMARY OF EMBODIMENTS OF THE INVENTION

One embodiment is a composition comprising, based on the total weight of the composition: 15 to 70 weight percent of a poly(phenylene ether); 15 to 70 weight percent of a rubber-modified polystyrene; 10 to 20 weight percent of a flame retardant comprising an organophosphate ester; and 0.2 to 4 weight percent of a mold release agent comprising a polydiorganosiloxane having a kinematic viscosity of 20,000 to 5,000,000 centistokes at 23° C., measured according to ISO 2555:1989; wherein the composition excludes polyolefin waxes. Another embodiment is method of forming a composition, the method comprising: melt-blending components comprising, based on the total weight of the composition, 15 to 70 weight percent of a poly(phenylene ether), 15 to 70 weight percent of a rubber-modified polystyrene, 10 to 20 weight percent of a flame retardant comprising an organophosphate ester, and 0.2 to 4 weight percent of a mold release agent comprising a polydiorganosiloxane having a kinematic viscosity of 20,000 to 5,000,000 centistokes at 23° C. to form the composition; wherein the polydiorganosiloxane prior to melt blending is in the form of a masterbatch in polystyrene, rubber-modified polystyrene, silica, or a combination thereof; wherein the masterbatch is a solid at 23° C. and one atmosphere; and wherein the composition excludes polyolefin waxes.

Another embodiment is an article comprising a composition comprising, based on the total weight of the composition: 15 to 70 weight percent of a poly(phenylene ether); 15 to 70 weight percent of a rubber-modified polystyrene; 10 to 20 weight percent of a flame retardant comprising an organophosphate ester; and 0.2 to 4 weight percent of a mold release agent comprising a polydiorganosiloxane having a kinematic viscosity of 20,000 to 5,000,000 centistokes at 23° C.; wherein the composition excludes polyolefin waxes.

These and other embodiments are described in detail below.

BRIEF DESCRIPTION OF THE DRAWINGS

Referring now to the drawings wherein like elements are numbered alike in two FIGURES.

DETAILED DESCRIPTION OF THE INVENTION

Figure 1:
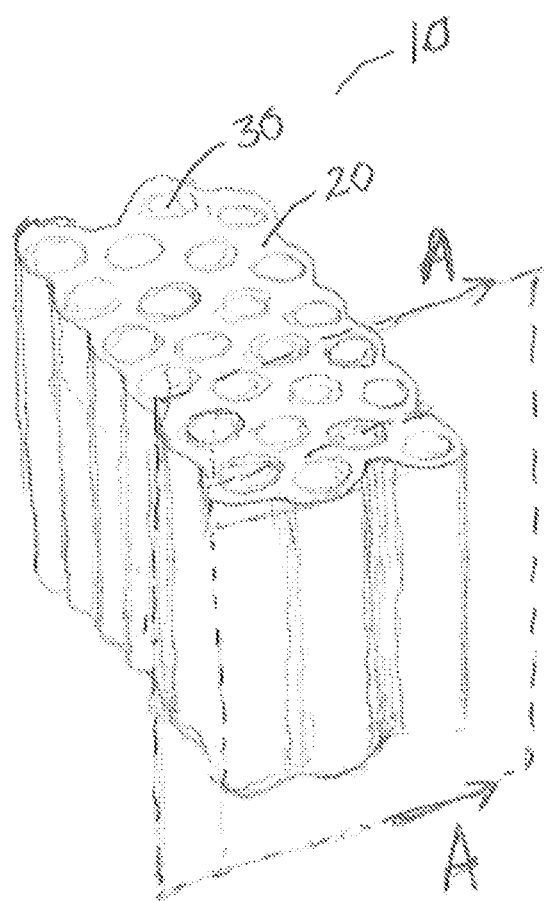
FIG. 1 is an elevated view of a battery holder.

The present inventor has determined that injection molding of articles with small draft angles and large areas of mold contact is facilitated by a molding composition containing specific amounts of a poly(phenylene ether), a rubber-modified polystyrene, a flame retardant comprising an organophosphate ester, and a mold release agent comprising a high viscosity polydiorganosiloxane, while excluding polyolefin waxes.

Thus, one embodiment is a composition comprising, based on the total weight of the composition: 15 to 70 weight percent of a poly(phenylene ether); 15 to 70 weight percent of a rubber-modified polystyrene; 10 to 20 weight percent of a flame retardant comprising an organophosphate ester; and 0.2 to 4 weight percent of a mold release agent comprising a polydiorganosiloxane having a kinematic viscosity of 20,000 to 5,000,000 centistokes at 23° C.; wherein the composition excludes polyolefin waxes.

As used herein, the term "polyolefin waxes" refers to olefin homopolymers and copolymers having a number average molecular weight of 500 to 10,000 daltons. As one example, the polyolefin wax can be a polyethylene having a number average molecular weight of 500 to 10,000 daltons. Other examples of polyolefin waxes are described in Japanese Patent Application Publication No. JP 2004-244537 of Kurasawa et al. As demonstrated in the working examples below, it has been determined that comparative examples containing polyolefin wax exhibit did not form a stable strand of extrudate and were therefore unsuitable for pelletization of extrudate.

The composition comprises a poly(phenylene ether). Poly(phenylene ether)s include those comprising repeating structural units having the formula

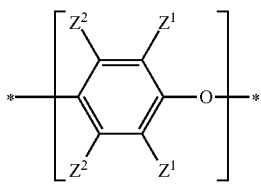

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

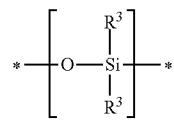

wherein each occurrence of $R^3$ is independently hydrogen, $C_1$-$C_{12}$ hydrocarbyl or $C_1$-$C_{12}$ halohydrocarbyl; and two terminal units having the structure

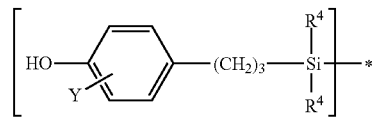

wherein Y is hydrogen, $C_1$-$C_{12}$ hydrocarbyl, $C_1$-$C_{12}$ hydrocarbyloxy, or halogen, and wherein each occurrence of $R^4$ is independently hydrogen, $C_1$-$C_{12}$ hydrocarbyl or $C_1$-$C_{12}$ halohydrocarbyl. In a very specific embodiment, each occurrence of $R^3$ and $R^4$ is methyl, and Y is methoxy.

In some embodiments, the monohydric phenol comprises 2,6-dimethylphenol, and the hydroxyaryl-terminated polysiloxane has the structure

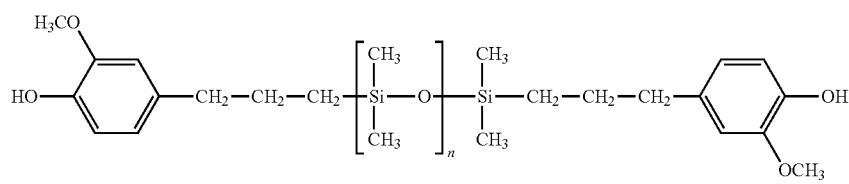

wherein n is, on average, 5 to 100, specifically 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. No. 8,017,697 to Carrillo et al., and U.S. Patent Application Publication No. US 2012/0329961 A1 of Carrillo et al.

In some embodiments, the poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether) comprises a poly(phenylene ether)-polysiloxane block copolymer. In these embodiments, the poly(phenylene ether)-polysiloxane block copolymer can, for example, contribute 0.05 to 2 weight percent, specifically 0.1 to 1 weight percent, more specifically 0.2 to 0.8 weight percent, of siloxane groups to the composition as a whole.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.5 deciliter per gram, specifically 0.36 to 0.5 deciliter per gram, more specifically 0.36 to 0.44 deciliter per gram. In specific embodiments, poly(phenylene ether) is a poly(2,6-dimethyl-1,4-phenylene ether) having an intrinsic viscosity of 0.3 to 0.5 deciliter per gram, specifically 0.36 to 0.5 deciliter per gram, more specifically 0.36 to 0.44 deciliter per gram.

The composition comprises the poly(phenylene ether) in an amount of 15 to 70 weight percent, based on the total weight of the composition. Within this range, the poly(phenylene ether) amount can be 30 to 65 weight percent, specifically 42 to 62 weight percent, more specifically 47 to 57 weight percent.

In addition to the poly(phenylene ether), the composition comprises a rubber-modified polystyrene. The rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene, based on the weight of the rubber-modified polystyrene. In some embodiments, the rubber-modified polystyrene has an effective gel content of 10 to 35 percent. Suitable rubber-modified polystyrenes are commercially available as, for example, HIPS3190 from SABIC Innovative Plastics, and HT640 from Idemitsu SM Sdn. Bhd.

The composition comprises the rubber-modified polystyrene in an amount of 15 to 70 weight percent, based on the total weight of the composition. Within this range, the amount of the rubber-modified polystyrene can be 20 to 50 weight percent, specifically 23 to 43 weight percent, more specifically 28 to 38 weight percent.

In some embodiments, the sum of the poly(phenylene ether) weight percent and the rubber-modified polystyrene weight percent is 75 to 89.6 weight percent, based on the total weight of the composition.

In addition to the poly(phenylene ether) and the rubber-modified polystyrene, the composition comprises a flame retardant comprising an organophosphate ester. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), and combinations thereof.

In some embodiments the organophosphate ester comprises a bis-aryl phosphate having the formula

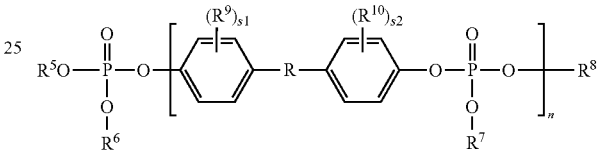

wherein R is independently at each occurrence a $C_1$-$C_{12}$ alkylene group; $R^9$ and $R^{10}$ are independently at each occurrence a $C_1$-$C_5$ alkyl group; $R^5$, $R^6$, and $R^8$ are independently a $C_1$-$C_{12}$ hydrocarbyl group; $R^7$ is independently at each occurrence a $C_1$-$C_{12}$ hydrocarbyl group; n is 1 to 25; and s1 and s2 are independently an integer equal to 0, 1, or 2. In some embodiments $OR^5$, $OR^6$, $OR^7$ and $OR^8$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

In some embodiments, the organophosphate ester is selected from the group consisting of tris(($C_1$-$C_6$-alkyl) phenyl) phosphates, resorcinol bis(diphenyl phosphate), bisphenol A bis(diphenyl phosphate), triphenyl phosphate, t-butylphenyl diphenyl phosphates, bis(t-butylphenyl) phenyl phosphates, and combinations thereof. In some embodiments, the organophosphate ester is selected from the group consisting of resorcinol bis(diphenyl phosphate), bisphenol A bis(diphenyl phosphate), and combinations thereof.

In some embodiments, the flame retardant consists of the organophosphate ester. In other embodiments, the flame retardant further comprises one or more additional flame retardants. In these embodiments, the additional flame retardant can be, for example, a metal dialkylphosphinate (e.g., aluminum tris(diethylphosphinate), a nitrogen-containing flame retardant (e.g., melamine phosphate, melamine pyrophosphate, melamine polyphosphate, melamine cyanurate), metal hydroxides (e.g., magnesium hydroxide, aluminum hydroxide, cobalt hydroxide), phosphazenes (e.g., linear and cyclic bis(phenoxy)phosphazenes), combinations thereof.

The composition comprises the flame retardant in an amount of 10 to 20 weight percent, based on the total weight of the composition. Within this range, the flame retardant amount can be 8 to 18 weight percent, specifically 9 to 17 weight percent.

In addition to the poly(phenylene ether), the rubber-modified polystyrene, and the flame retardant, the composition comprises a mold release agent comprising a polydiorganosiloxane. The polydiorganosiloxane has a kinematic viscosity of 20,000 to 5,000,000 centistokes at 23° C. Within this range, the kinematic viscosity can be 100,000 to 5,000,000 centistokes, specifically 200,000 to 5,000,000 centistokes, more specifically 500,000 to 5,000,000 centistokes, even more specifically 1,000,000 to 5,000,000 centistokes. Kinematic viscosity can be determined by Brookfield viscometer according to ISO 2555:1989. For example, kinematic viscosities can be determined according to ISO 2555:1989 at 23° C. using a Brookfield type viscometer, model LVDV-I Prime, Brookfield Engineering Laboratories, Inc., and a type LV-4 spindle.

In some embodiments, the polydiorganosiloxane comprises diorganosiloxane repeat units having the structure

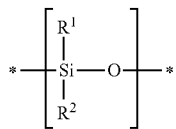

wherein each occurrence of $R^1$ and $R^2$ is independently $C_1$-$C_{12}$ hydrocarbyl. In some embodiments, each occurrence of $R^1$ and $R^2$ is independently methyl or phenyl. In some embodiments, each occurrence of $R^1$ and $R^2$ is methyl.

There is no particular limitation on the end groups of the polydiorganosiloxane. For example, the end-groups can be reactive (e.g., vinyl, styryl) or unreactive (e.g., methyl, phenyl). In some embodiments, the polydiorganosiloxane is selected from the group consisting of polydimethylsiloxanes, trimethylsilyl-terminated polydimethylsiloxanes, vinyldimethylsilyl-terminated polydimethylsiloxanes, epoxycyclohexyldimethylsilyl-terminated polydimethylsiloxanes, glycidoxypropyldimethylsilyl-terminated polydimethylsiloxanes, p-styryldimethylsilyl-terminated polydimethylsiloxanes, methacryloxypropyldimethylsilyl-terminated polydimethylsiloxanes, acryloxydimethylsilyl-terminated polydimethylsiloxanes, aminopropyldimethylsilyl-terminated polydimethylsiloxanes, 3-isocyanatopropyldimethylsilyl-terminated polydimethylsiloxanes, 3-mercaptopropyldimethylsilyl-terminated polydimethylsiloxanes, 3-ureidopropyldimethylsilyl-terminated polydimethylsiloxanes, ethyldimethylsilyl-terminated polydimethylsiloxanes, propyldimethylsilyl-terminated polydimethylsiloxanes, hexyldimethylsilyl-terminated polydimethylsiloxanes, octyldimethylsilyl-terminated polydimethylsiloxanes, decyldimethylsilyl-terminated polydimethylsiloxanes, phenyldimethylsilyl-terminated polydimethylsiloxanes, and combinations thereof. In some embodiments, the polydiorganosiloxane comprises a polydimethylsiloxane.

In some embodiments, the mold release agent consists of the polydiorganosiloxane. In other embodiments, the mold release agent further comprises an additional mold release agent selected from the group consisting of fatty acid esters, partially saponified fatty acid esters, polyolefins having a number average molecular weight greater than 10,000 daltons, tetrafluoroethylenes, and combinations thereof, provided that the mold release agent does not comprise a polyolefin wax.

The composition comprises the mold release agent in an amount of 0.2 to 4 weight percent, based on the total weight of the composition. Within this range, the amount of mold release agent can be 0.7 to 3 weight percent, or greater than 0.25 to less than 2.5 weight percent, or 0.3 to 2 weight percent, or 1 to 2 weight percent.

The composition can, optionally, further comprise one or more additives known in the thermoplastics art. For example, the composition can, optionally, further comprise an additive chosen from stabilizers, processing aids, drip retardants, UV blockers, dyes, pigments, antioxidants, antistatic agents, mineral oil, metal deactivators, and combinations thereof. When present, such additives are typically used in a total amount of less than or equal to 5 weight percent, specifically less than or equal to 2 weight percent, more specifically less than or equal to 1 weight percent, based on the total weight of the composition.

The composition can, optionally, exclude components other than those described herein as required. For example, the composition can, optionally, exclude one or more of homopolystyrenes, block copolymers of alkenyl aromatic compounds and conjugated dienes, hydrogenated block copolymers of alkenyl aromatic compounds and conjugated dienes, polyolefins, polyamides, and polyesters. In some embodiments, the composition excludes any polymer other than the poly(phenylene ether), the rubber-modified polystyrene, and the polydiorganosiloxane.

In a specific embodiment of the composition, the poly(phenylene ether) is a poly(2,6-dimethyl-1,4-phenylene ether) having an intrinsic viscosity of 0.34 to 0.46 deciliter per gram as measured in chloroform at 25° C.; the rubber-modified polystyrene comprises 80 to 96 weight percent polystyrene, and 4 to 20 weight percent polybutadiene, based on the weight of the rubber-modified polystyrene; the organophosphate ester comprises resorcinol bis(diphenyl phosphate), bisphenol A bis(diphenyl phosphate), or a combination thereof; the polydiorganosiloxane is a polydimethylsiloxane having a kinematic viscosity of 1,000,000 to 5,000,000 centistokes at 23° C.; and the composition comprises 47 to 67 weight percent of the poly(phenylene ether), 20 to 30 weight percent of the rubber-modified polystyrene, 8 to 18 weight percent of the organophosphate ester, and 0.3 to 2 weight percent of the polydiorganosiloxane.

One embodiment is a method of forming a composition, the method comprising: melt-blending components comprising, based on the total weight of the composition, 15 to 70 weight percent of a poly(phenylene ether), 15 to 70 weight percent of a rubber-modified polystyrene, 10 to 20 weight percent of a flame retardant comprising an organophosphate ester, and 0.2 to 4 weight percent of a mold release agent comprising a polydiorganosiloxane having a kinematic viscosity of 20,000 to 5,000,000 centistokes at 23° C. to form the composition; wherein the polydiorganosiloxane prior to melt blending is in the form of a masterbatch in polystyrene, rubber-modified polystyrene, silica, or a combination thereof; wherein the masterbatch is a solid at 23° C. and one atmosphere; and wherein the composition excludes polyolefin waxes.

The composition can be prepared by melt-blending or melt-kneading the components of the composition. The melt-blending or melt-kneading can be performed using common equipment such as ribbon blenders, HENSCHEL™ mixers, BANBURY™ mixers, drum tumblers, single-screw extruders, twin-screw extruders, multi-screw extruders, co-kneaders, and the like. For example, the present composition can be prepared by melt-blending the components in a twin-screw extruder at a temperature of 270 to 300° C., specifically 280 to 290° C.

In some embodiments, the polydiorganosiloxane is provided to the melt-blending apparatus in the form of a masterbatch in a material that is a solid at room temperature. Such materials include homopolystyrene, rubber-modified polystyrene, polypropylene, low density polyethylene, high density polyethylene, polyamide, polyoxymethylene, acrylonitrile-butadiene-styrene copolymer, poly(butylene terephthalate), thermoplastic polyester elastomer, silica, and combinations thereof. In these embodiments, the masterbatch preferably comprises 20 to 80 weight percent of the polydiorganosiloxane, and 20 to 80 weight percent of the other material. In a specific embodiment, the polydiorganosiloxane is provided to the melt-blending apparatus in the form of a masterbatch comprising 25 to 75 weight percent of the polydiorganosiloxane and 25 to 75 weight percent of rubber-modified polystyrene.

All of the variations described in the context of the composition apply as well to the method of forming the composition.

In a specific embodiment of the method, the poly(phenylene ether) is a poly(2,6-dimethyl-1,4-phenylene ether) having an intrinsic viscosity of 0.34 to 0.46 deciliter per gram as measured in chloroform at 25° C.; the rubber-modified polystyrene comprises 80 to 96 weight percent polystyrene, and 4 to 20 weight percent polybutadiene, based on the weight of the rubber-modified polystyrene; the organophosphate ester comprises resorcinol bis(diphenyl phosphate), bisphenol A bis(diphenyl phosphate), or a combination thereof; the polydiorganosiloxane is a polydimethylsiloxane having a kinematic viscosity of 1,000,000 to 5,000,000 centistokes at 23° C.; the polydiorganosiloxane prior to melt blending is in the form of a masterbatch in rubber-modified polystyrene; and the composition comprises 47 to 67 weight percent of the poly(phenylene ether), 20 to 30 weight percent of the rubber-modified polystyrene, 8 to 18 weight percent of the organophosphate ester, and 0.3 to 2 weight percent of the polydiorganosiloxane.

Another embodiment is an article comprising the composition. Thus, one embodiment is an article comprising a composition comprising, based on the total weight of the composition: 15 to 70 weight percent of a poly(phenylene ether); 15 to 70 weight percent of a rubber-modified polystyrene; 10 to 20 weight percent of a flame retardant comprising an organophosphate ester; and 0.2 to 4 weight percent of a mold release agent comprising a polydiorganosiloxane having a kinematic viscosity of 20,000 to 5,000,000 centistokes at 23° C.; wherein the composition excludes polyolefin waxes.

Figure 2:
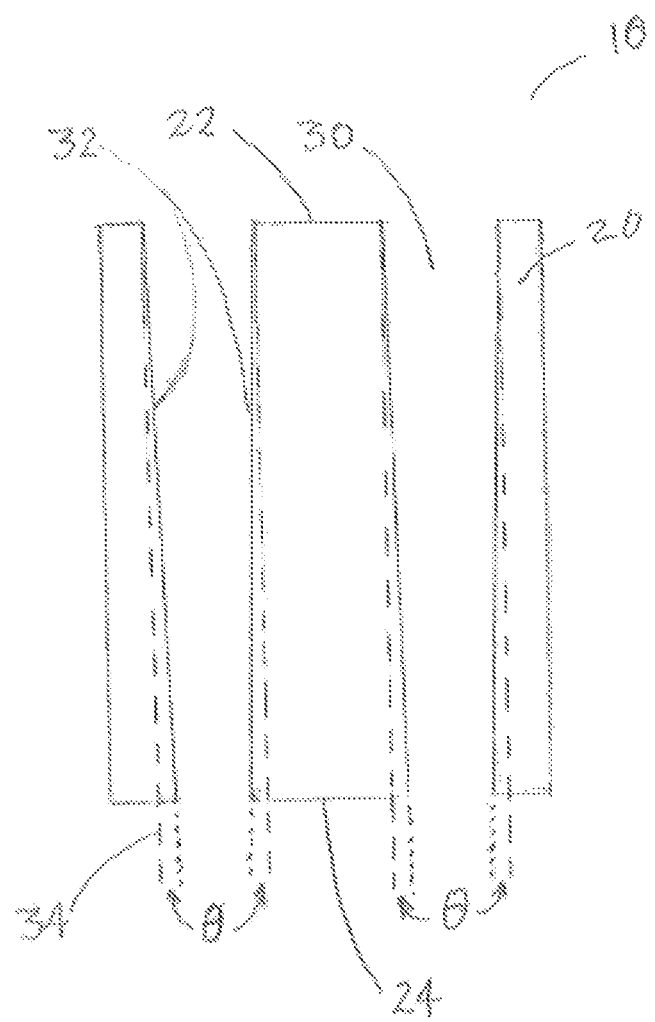
FIG. 2 is a cross-section of the battery holder through plane AA shown in FIG. 1.

The article is particularly useful for injection molding articles that present an ejection force challenge. In some embodiments, such articles can be characterized as comprising a cylindrical or conical portion characterized by a length of at least 10 millimeters and a draft angle of 0 to 0.5 degree. An example of such an article is an injection molded lithium battery holder. FIG. 1 is an elevated view of such a battery holder 10, comprising holder walls 20, and voids 30 to be later filled by lithium batteries. The concept of draft angle, theta (θ), is illustrated by FIG. 2, which is a cross-sectional view of the lithium battery holder through plane AA shown in FIG. 1. In FIG. 2, the battery holder 10 comprises holder walls 20, each having a top face 22 and a bottom face 24. The battery holder 10 further comprises voids 30, which are shown with a conical shape characterized by angle θ, which is defined by the line of the cylinder wall 32 and a normal 34 to the top face 22 and the bottom face 24. When θ is zero degrees, then the void is has a cylindrical shape. When θ is greater than zero degrees but less than or equal to 0.5 degrees, then the void has the shape of a conical section. In either case (i.e., when θ has a value from 0 to 0.5 degrees), ejection of the battery holder 10 from the mold in a direction normal to the top face 22 and the bottom face 24 is made more difficult by the large area of contact between the battery holder 10 and the mold, and the fact that the area of contact is parallel or nearly parallel to the ejection direction.

The composition is therefore particularly useful for injection molding articles comprising a cylindrical or conical portion characterized by a length of at least 10 millimeters and a draft angle of 0 to 0.5 degree. Such articles include, for example, battery holders for back-up power supplies.

In a very specific embodiment of the article, the poly (phenylene ether) is a poly(2,6-dimethyl-1,4-phenylene ether) having an intrinsic viscosity of 0.34 to 0.46 deciliter per gram as measured in chloroform at 25° C.; the rubber-modified polystyrene comprises 80 to 96 weight percent polystyrene, and 4 to 20 weight percent polybutadiene, based on the weight of the rubber-modified polystyrene; the organophosphate ester comprises resorcinol bis(diphenyl phosphate), bisphenol A bis(diphenyl phosphate), or a combination thereof; the polydiorganosiloxane is a polydimethylsiloxane having a kinematic viscosity of 1,000,000 to 5,000,000 centistokes at 23° C.; and the composition comprises 47 to 67 weight percent of the poly(phenylene ether), 20 to 30 weight percent of the rubber-modified polystyrene, 8 to 18 weight percent of the organophosphate ester, and 0.3 to 2 weight percent of the polydiorganosiloxane.

As demonstrated in the working examples below, the composition provides highly effective mold release. Specifically, the high viscosity polydiorganosiloxanes of the composition are more effective mold release agents compared to mold release agents other than polydiorganosiloxanes and compared to lower viscosity polydiorganosiloxanes.

The invention includes at least the following embodiments.

Embodiment 1

A composition comprising, based on the total weight of the composition: 15 to 70 weight percent of a poly(phenylene ether); 15 to 70 weight percent of a rubber-modified polystyrene; 10 to 20 weight percent of a flame retardant comprising an organophosphate ester; and 0.2 to 4 weight percent of a mold release agent comprising a polydiorganosiloxane having a kinematic viscosity of 20,000 to 5,000,000 centistokes at 23° C., measured at 23° C. according to ISO 2555:1989; wherein the composition excludes polyolefin waxes.

Embodiment 2

The composition of embodiment 1, wherein the poly (phenylene ether) is a poly(2,6-dimethyl-1,4-phenylene ether) having an intrinsic viscosity of 0.3 to 0.5 deciliter per gram as measured in chloroform at 25° C.

Embodiment 3

The composition of embodiment 1 or 2, wherein the rubber-modified polystyrene comprises 80 to 96 weight percent polystyrene, and 4 to 20 weight percent polybutadiene, based on the weight of the rubber-modified polystyrene.

Embodiment 4

The composition of any one of embodiments 1-3, wherein the sum of the poly(phenylene ether) weight percent and the rubber-modified polystyrene weight percent is 75 to 89.6 weight percent.

Embodiment 5

The composition of any one of embodiments 1-4, wherein the organophosphate ester is selected from the group consisting of tris(($C_1$-$C_6$-alkyl)phenyl) phosphates, resorcinol bis(diphenyl phosphate), bisphenol A bis(diphenyl phosphate), triphenyl phosphate, t-butylphenyl diphenyl phosphates, bis(t-butylphenyl) phenyl phosphates, and combinations thereof.

Embodiment 6

The composition of any one of embodiments 1-5, wherein the organophosphate ester is selected from the group consisting of resorcinol bis(diphenyl phosphate), bisphenol A bis(diphenyl phosphate), and combinations thereof.

Embodiment 7

The composition of any one of embodiments 1-6, wherein the flame retardant consists of the organophosphate ester.

Embodiment 8

The composition of any one of embodiments 1-7, wherein the polydiorganosiloxane comprises diorganosiloxane repeat units having the structure

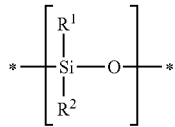

wherein each occurrence of $R^1$ and $R^2$ is independently $C_1$-$C_{12}$ hydrocarbyl.

Embodiment 9

The composition of any one of embodiments 1-8, wherein the polydiorganosiloxane is selected from the group consisting of polydimethylsiloxanes, trimethylsilyl-terminated polydimethylsiloxanes, vinyldimethylsilyl-terminated polydimethylsiloxanes, epoxycyclohexyldimethylsilyl-terminated polydimethylsiloxanes, glycidoxypropyldimethylsilyl-terminated polydimethylsiloxanes, p-styryldimethylsilyl-terminated polydimethylsiloxanes, methacryloxypropyldimethylsilyl-terminated polydimethylsiloxanes, acryloxydimethylsilyl-terminated polydimethylsiloxanes, aminopropyldimethylsilyl-terminated polydimethylsiloxanes, 3-isocyanatopropyldimethylsilyl-terminated polydimethylsiloxanes, 3-mercaptopropyldimethylsilyl-terminated polydimethylsiloxanes, 3-ureidopropyldimethylsilyl-terminated polydimethylsiloxanes, ethyldimethylsilyl-terminated polydimethylsiloxanes, propyldimethylsilyl-terminated polydimethylsiloxanes, hexyldimethylsilyl-terminated polydimethylsiloxanes, octyldimethylsilyl-terminated polydimethylsiloxanes, decyldimethylsilyl-terminated polydimethylsiloxanes, phenyldimethylsilyl-terminated polydimethylsiloxanes, and combinations thereof.

Embodiment 10

The composition of any one of embodiments 1-9, comprising a continuous phase comprising the poly(phenylene ether), the rubber-modified polystyrene, and the organophosphate ester; and a disperse phase comprising the polydiorganosiloxane; wherein the disperse phase comprises disperse phase domains characterized by a domain length of 150 to 500 nanometers.

Embodiment 11

The composition of embodiment 1, wherein the poly(phenylene ether) is a poly(2,6-dimethyl-1,4-phenylene ether) having an intrinsic viscosity of 0.34 to 0.46 deciliter per gram as measured in chloroform at 25° C.; wherein the rubber-modified polystyrene comprises 80 to 96 weight percent polystyrene, and 4 to 20 weight percent polybutadiene, based on the weight of the rubber-modified polystyrene; wherein the organophosphate ester comprises resorcinol bis(diphenyl phosphate), bisphenol A bis(diphenyl phosphate), or a combination thereof; wherein the polydiorganosiloxane is a polydimethylsiloxane having a kinematic viscosity of 1,000,000 to 5,000,000 centistokes at 23° C.; and wherein the composition comprises 47 to 67 weight percent of the poly(phenylene ether), 20 to 30 weight percent of the rubber-modified polystyrene, 8 to 18 weight percent of the organophosphate ester, and 0.3 to 2 weight percent of the polydiorganosiloxane.

Embodiment 12

A method of forming a composition, the method comprising: melt-blending components comprising, based on the total weight of the composition, 15 to 70 weight percent of a poly(phenylene ether), 15 to 70 weight percent of a rubber-modified polystyrene, 10 to 20 weight percent of a flame retardant comprising an organophosphate ester, and 0.2 to 4 weight percent of a mold release agent comprising a polydiorganosiloxane having a kinematic viscosity of 20,000 to 5,000,000 centistokes at 23° C. to form the composition; wherein the polydiorganosiloxane prior to melt blending is in the form of a masterbatch in polystyrene, rubber-modified polystyrene, silica, or a combination thereof; wherein the masterbatch is a solid at 23° C. and one atmosphere; and wherein the composition excludes polyolefin waxes.

Embodiment 13

The method of embodiment 12, wherein the composition comprises a continuous phase comprising the poly(phenylene ether), the rubber-modified polystyrene, and the organophosphate ester; and a disperse phase comprising the polydiorganosiloxane; wherein the disperse phase comprises disperse phase domains characterized by a domain length of 150 to 500 nanometers.

Embodiment 14

The method of embodiment 12 or 13, wherein the poly(phenylene ether) is a poly(2,6-dimethyl-1,4-phenylene ether) having an intrinsic viscosity of 0.34 to 0.46 deciliter per gram as measured in chloroform at 25° C.; wherein the rubber-modified polystyrene comprises 80 to 96 weight percent polystyrene, and 4 to 20 weight percent polybutadiene, based on the weight of the rubber-modified polystyrene; wherein the organophosphate ester comprises resorcinol bis(diphenyl phosphate), bisphenol A bis(diphenyl phosphate), or a combination thereof; wherein the polydiorganosiloxane is a polydimethylsiloxane having a kinematic viscosity of 1,000,000 to 5,000,000 centistokes at 23° C.; wherein the polydiorganosiloxane prior to melt blending is in the form of a masterbatch in rubber-modified polystyrene; and wherein the composition comprises 47 to 67 weight percent of the poly(phenylene ether), 20 to 30 weight percent of the rubber-modified polystyrene, 8 to 18 weight percent of the organophosphate ester, and 0.3 to 2 weight percent of the polydiorganosiloxane.

Embodiment 15

An article comprising a composition comprising, based on the total weight of the composition: 15 to 70 weight percent of a poly(phenylene ether); 15 to 70 weight percent of a rubber-modified polystyrene; 10 to 20 weight percent of a flame retardant comprising an organophosphate ester; and 0.2 to 4 weight percent of a mold release agent comprising a polydiorganosiloxane having a kinematic viscosity of 20,000 to 5,000,000 centistokes at 23° C.; wherein the composition excludes polyolefin waxes.

Embodiment 16

The article of embodiment 15, wherein the composition comprises a continuous phase comprising the poly(phenylene ether), the rubber-modified polystyrene, and the organophosphate ester; and a disperse phase comprising the polydiorganosiloxane; wherein the disperse phase comprises disperse phase domains characterized by a domain length of 150 to 500 nanometers.

Embodiment 17

The article of embodiment 15 or 16, wherein the poly(phenylene ether) is a poly(2,6-dimethyl-1,4-phenylene ether) having an intrinsic viscosity of 0.34 to 0.46 deciliter per gram as measured in chloroform at 25° C.; wherein the rubber-modified polystyrene comprises 80 to 96 weight percent polystyrene, and 4 to 20 weight percent polybutadiene, based on the weight of the rubber-modified polystyrene; wherein the organophosphate ester comprises resorcinol bis(diphenyl phosphate), bisphenol A bis(diphenyl phosphate), or a combination thereof; wherein the polydiorganosiloxane is a polydimethylsiloxane having a kinematic viscosity of 1,000,000 to 5,000,000 centistokes at 23° C.; and wherein the composition comprises 47 to 67 weight percent of the poly(phenylene ether), 20 to 30 weight percent of the rubber-modified polystyrene, 8 to 18 weight percent of the organophosphate ester, and 0.3 to 2 weight percent of the polydiorganosiloxane.

Embodiment 18

The article of any one of embodiments 15-17, comprising a cylindrical or conical portion characterized by a length of at least 10 millimeters and a draft angle of 0 to 0.5 degree.

Embodiment 19

The article of any one of embodiments 15-18, wherein the article is a battery holder for a back-up power supply.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples 1-14, Comparative Examples 1-13

Materials used to form molding compositions are summarized in Table 1.

TABLE 1

| Component | Description |
| --- | --- |
| PPE 1 | Poly(2,6-dimethyl-1,4-phenylene ether), CAS Reg. No. 25134-01-4, having an intrinsic viscosity of about 0.46 deciliter per gram as measured in chloroform at 25° C.; obtained as PPO ™ 646 from SABIC Innovative Plastics. |
| PPE 2 | Poly(2,6-dimethyl-1,4-phenylene ether), CAS Reg. No. 25134-01-4, having an intrinsic viscosity of about 0.40 deciliter per gram as measured in chloroform at 25° C.; obtained as PPO ™ 640 from SABIC Innovative Plastics. |
| HIPS | High Impact Polystyrene, CAS Reg. No. 9003-55-8, having a polystyrene content of 90 weight percent and a polybutadiene content of 10 weight percent; obtained as HT640 from Idemitsu SM Sdn. Bhd. |
| SBS | Polystyrene-polybutadiene-polystyrene triblock copolymer, CAS Reg. No. 9003-55-8, having a polystyrene content of about 31 weight percent and a solution viscosity of about 4 Pascal-seconds measured at 25° C. in a 25 weight percent solution in toluene; obtained as KRATON ™ D1101 from Kraton Performance Polymers Inc. |
| TSAN | Poly(styrene-acrylonitrile)-encapsulated polytetrafluoroethylene, containing 50 weight percent polytetrafluoroethylene; obtained as a CYCOLAC ™ INP449 Resin from SABIC Innovative Plastics. |
| LLDPE | Linear low density polyethylene (poly(ethylene-co-butylene)), CAS Reg. No. 25087-34-7, having a density of 0.925 grams/centimeter$^3$ and a melt volume-flow rate of about 20 centimeter$^3$/10 minutes at 190° C. and 2.16 kilogram load; obtained as ESCORENE ™ LL5100.09 from ExxonMobil. |
| PETS | Pentaerythritol tetrastearate, CAS Reg. No. 115-83-3, obtained as UNISTER ™ F538 from FACI S.p.A. |
| PEAS | Pentaerythritol adipate stearate oligomer, CAS Reg. No. 68130-34-7; obtained as LOXIOL ™ G70S from Emery Oleochemicals. |

TABLE 1-continued

| Component | Description |
|---|---|
| P1D | Poly(1-decene), CAS Reg. No. 68037-01-4, having a viscosity of 6 centistokes at 100° C.; obtained as DURASYN ™ 164 from Ineos. |
| PDMS MB 1 | Masterbatch of 50 weight percent HIPS (CAS Reg. No. 9003-55-8) and 50 weight percent polydimethylsiloxane (CAS Reg. No. 63148-62-9, having a viscosity greater than 1,000,000 centistokes at 23° C.); obtained as BY 27-004 from Dow Corning Corporation. |
| PDMS MB 2 | Masterbatch of 50 weight percent HIPS (CAS Reg. No. 9003-55-8) and 50 weight percent vinyldimethylsiloxane end-capped polydimethylsiloxane (CAS Reg. No. 68083-19-2, having a viscosity of about 1,000,000 centistokes at 23° C.); obtained as MB 50-004 from Dow Corning Corporation. |
| PDMS MB 3 | Master batch of 35 weight percent silica (CAS Reg. No. 112945-52-5) and 65 weight percent polydimethylsiloxane (CAS Reg. No. 63148-62-9, having a viscosity greater than 1,000,000 centistokes at 23° C.); obtained as GENIOPLAST ™ PELLET S K540, from Wacker Asahikasei Silicone Co. Ltd. |
| PDMS 4 | Polydimethylsiloxane, CAS Reg. No. 63148-62-9, having a viscosity of about 20 centistokes at 23° C.; obtained from Dow Corning Corporation, Wacker Asahikasei Silicone Co. Ltd., or Momentive Performance Materials. |
| PDMS 5 | Polydimethylsiloxane, CAS Reg. No. 63148-62-9, having a viscosity of about 1,000 centistokes at 23° C.; obtained from Dow Corning Corporation. |
| PDMS 6 | Polydimethylsiloxane, CAS Reg. No. 63148-62-9, having a viscosity of about 10,000 centistokes at 23° C.; obtained from Dow Corning Corporation. |
| PDMS 7 | Polydimethylsiloxane, CAS Reg. No. 63148-62-9, having a viscosity of about 100,000 centistokes at 23° C.; obtained from Dow Corning Corporation. |
| PDMS 8 | Polydimethylsiloxane, CAS Reg. No. 63148-62-9, having a viscosity of about 1,000,000 centistokes at 23° C.; obtained from Wacker Asahikasei Silicone Co. Ltd. |
| PMPS | Poly(methylphenylsiloxane), CAS Reg. No. 68083-14-7, having a viscosity of about 20 centistokes at 23° C.; obtained as TSF437 from Momentive Performance Materials. |
| Polyolefin wax | Polyolefin wax (low molecular weight polyethylene) having a number average molecular weight of about 2,000 daltons; obtained as SANWAX ™ 151-P from Sanyo Chemical Industries. |
| PTFE | Polytetrafluoroethylene, CAS Reg. No. 9002-84-0; obtained as L-5 from Daikin Industries Ltd. |
| Phosphite | Tris(2,4-di-tert-butylphenyl) phosphite, CAS Reg. No. 31570-04-4; obtained as IRGAFOS ™ 168, from BASF. |
| MgO | Magnesium oxide, CAS Reg. No. 1309-48-4; obtained as KYOWAMAG ™ 150 from Kyowa Chemical Co. Ltd. |
| ZnS | Zinc sulfide, CAS Reg. No. 1314-98-3, obtained as SACHTOLITH ™ HD-S from Sachtleben Chemie GmbH. |
| FR 1 | Resorcinol bis(diphenyl phosphate), CAS Reg. No. 57583-54-7; obtained from Daihachi Chemical Industry Co., Ltd. |
| FR 2 | Bisphenol A bis(diphenyl phosphate), CAS Reg. No. 181028-79-5; obtained from Daihachi Chemical Industry Co., Ltd. or ADEKA Co. Ltd. |

Compositions are summarized in Table 2, where component amounts are expressed in weight percent based on the total weight of the composition. Compositions for Examples 1-10 and Comparative Examples 1-13 were prepared by compounding on a Toshiba TEM50A twin-screw extruder having a 53 mm internal diameter and operating at a screw rotation rate of 300 rpm and a throughput of about 100 kg/h. The extruder utilized eleven zones having temperatures of 150° C./270° C./280° C./280° C./280° C./280° C./280° C./280° C./280° C./280° C./290° C. from feed throat to die (with nine holes). The procedure used to prepare Example 11 and Comparative Examples 14 and 15 was similar, except that the die had five holes, and the distance between the die and the pelletizer was increased to achieve greater strand cooling before pelletization.

Molded articles for physical property testing were injection molded on a Toyo Machinery & Metal Co. Ltd. Toyo Paster Ti-80G injection molding machine using a barrel temperature of 230° C. and a mold temperature of 50° C.

Molded articles for mold release testing were injection molded on a Sumitomo Heavy Industry Ltd., SE75DUZ injection molding machine, using a barrel temperature set of 270° C./280° C./290° C./290° C./280° C. and a mold temperature of 80° C. The mold tool was designed with 16 bosses, each 12 millimeters in height along the 8 millimeter inner diameter and 14 millimeter outer diameter cylinders. The entire molded article was 80 millimeters long by 100 millimeter wide by 2.14 millimeters thick. In Table 2, the property "Ejection force (kgf)", is the measured ejection force, in units of kilogram force, of the eject pin required to push out the molded parts from mold tool with 2% speed after 25 seconds cooling time. The ejection force values in Table 2 are the average of 10 measurements for each composition. "Relative ejection force vs. C. Ex. 1(%)" is the ejection force of a given sample normalized to the ejection force of Comparative Example 1. The weight of molded parts was adjusted to be 36 grams by controlling the cushion in the cylinder of the injection machine, using Comparative Example 1 as the reference.

In Table 2, the compositional characteristic "PDOS content, XRF (wt %)" is the weight percent of polydiorganosiloxane, based on the total weight of the composition and calculated from weight percent elemental silicon as determined by X-ray fluorescence (XRF). The XRF measurements were calibrated with samples consisting of 0, 2, 4, 6, 8, and 10 weight percent wt % of zeolite (silica content: 20 weight percent) in NORYL™ 731 Resin.

In Table 2, the compositional characteristic "PDOS content, calc. (wt %)" is the weight percent of polydiorganosiloxane, based on the weight of the composition and calculated based on the compositions and amounts of polydiorganosiloxane-containing components in the composition.

In Table 2, the property "Handling (Blending and feeding capability)" was determined by operating normally to blend the ingredients and feed from hopper to extruder. The ingredients were blended in a 60 liter plastic bag with the SUPER FLOATER™ SFC-50 (Kawata Mfg. Co. Ltd.) equipped with two blades. The blend was fed through the feeder to the extruder, Toshiba TEM50A twin-screw extruder having a 53 mm internal diameter. A rating of "O" corresponds to components being weighed smoothly and mixed properly. A rating of "X" corresponds to difficulty taking the ingredient out of its container, weighing it, and mixing it with other components. The highest viscosity neat polydimethylsiloxane (PDMS 8) did not mix well with other components during pre-extrusion blending. Instead, it remained segregated and formed a ball-like mass.

The property "Processability (absence of strand drip)" was determined by visually observing the extrudate exiting the extruder die hole. A rating of "O" corresponds to stable strand formation without strand drip. A rating of "X" corresponds to the occurrence of strand drip and the absence of stable strand formation.

The property "Delamination, visual inspection" was determined by visually inspecting the surface of molded bars having a 1.2 millimeter thickness. A rating of "O" corresponds to a smooth surface without nonuniformities. A rating of "X" corresponds to severe delamination (nonuniformity) observed on the surface of molded parts.

The property "Silicone domain length (nm)" is the average length of five polydiorganosiloxane disperse phase domains, expressed in units of nanometers, as determined by Scanning Transmittance Electron Microscopy on a Zeiss Supra 40 VP. The specimen was prepared by cryomicrotome and stained with $OsO_4$ for 15 minutes and $RuO_4$ for 45 seconds.

The property "Volatile silicone at 125° C. (ppm)" is the concentration, in units of parts per million by weight based on the total weight of the solution, of volatile silicone compounds such as the cyclic silicone oligomers known as D3, D4 and D5. It was determined by thermodesorption gas chromatography with mass spectrometric detection (TDS-GC/MS). An amount of sample (about 20 milligrams) was weighed and thermally desorbed at 125° C. for 10 minutes in splitless mode. The absorbed solutes were cryofocused in a CIS4 PTV inlet at 100° C. After desorption, the PTV inlet was programmed to ramp in temperature to 350° C. at 12° C./min and held for 10 minutes to transfer the trapped solutes in the GC (the carrier was helium at 1 milliliter/minute). Injection was performed in split mode (split ratio 125 to 1). The gas chromatography column was a CP VF-1 ms (30 meters by 250 micrometers by 0.25 micrometers) and was heated at 40° C. (2 minutes) and ramped to 250° C. at 10° C./minute and then ramped to 325° C. at 25° C./minute.

The results in Table 2 show the compositions of inventive Examples 1-14 each exhibit improved mold release relative to Comparative Example 1, as evidenced by relative ejection forces ranging from 67-99% (or 67-85%, if less preferred Example 7 is excluded). Except for less preferred Example 8, the inventive Examples did not exhibit surface delamination. Also, the inventive examples other than Examples 9 and 10 exhibited good handling characteristics. All examples exhibited low levels of volatile silicones. Relatively long silicone domain length values were observed for the inventive examples for which they were measured. Increased domain length has been correlated with improved mold release.

TABLE 2

|  | C. Ex. 1 | Ex. 1 | Ex. 2 | Ex. 3 | Ex. 4 | Ex. 5 |
| --- | --- | --- | --- | --- | --- | --- |
| COMPOSITIONS | | | | | | |
| PPE 1 | 53.26 | 0 | 0 | 0 | 0 | 0 |
| PPE 2 | 0 | 58.00 | 52.00 | 52.00 | 56.64 | 56.64 |
| HIPS | 28.68 | 22.00 | 32.00 | 32.86 | 24.23 | 25.23 |
| SBS | 1.64 | 1.64 | 0 | 0 | 3.0 | 3.0 |
| TSAN | 0.12 | 0.12 | 0 | 0 | 0.12 | 0.12 |
| Polyolefin wax | 0 | 0 | 0 | 0 | 0 | 0 |
| LLDPE | 1.23 | 1.23 | 0 | 0 | 0 | 0 |
| PETS | 0 | 0 | 0 | 0 | 0 | 0 |
| PEAS | 0 | 0 | 0 | 0 | 0 | 0 |
| P1D | 0 | 0 | 0 | 0 | 0 | 0 |
| PDMS MB 1 | 0 | 3.0 | 3.0 | 0 | 2.0 | 1.0 |
| PDMS MB 2 | 0 | 0 | 0 | 0 | 0 | 0 |
| PDMS MB 3 | 0 | 0 | 0 | 2.14 | 0 | 0 |
| PDMS 4 | 0 | 0 | 0 | 0 | 0 | 0 |
| PDMS 5 | 0 | 0 | 0 | 0 | 0 | 0 |
| PDMS 6 | 0 | 0 | 0 | 0 | 0 | 0 |
| PDMS 7 | 0 | 0 | 0 | 0 | 0 | 0 |
| PDMS 8 | 0 | 0 | 0 | 0 | 0 | 0 |
| PMPS | 0 | 0 | 0 | 0 | 0 | 0 |
| PTFE | 0 | 0 | 0 | 0 | 0 | 0 |
| Phosphite | 0.08 | 0.08 | 0 | 0 | 0.08 | 0.08 |
| MgO | 0.12 | 0.12 | 0 | 0 | 0.12 | 0.12 |
| ZnS | 0.12 | 0.12 | 0 | 0 | 0.12 | 0.12 |
| FR 1 | 14.75 | 13.69 | 13.0 | 13.0 | 13.69 | 13.69 |
| FR 2 | 0 | 0 | 0 | 0 | 0 | 0 |
| PDOS content, XRF (wt %) | 0 | 1.6 | 1.5 | 3.6 | 1.0 | 0.5 |
| PDOS content, calc. (wt %) | 0 | 1.5 | 1.5 | 2.1 | 1.0 | 0.5 |

TABLE 2-continued

| PROPERTIES | | | | | | |
|---|---|---|---|---|---|---|
| Handling (Blending and feeding capability) | ○ | ○ | ○ | ○ | ○ | ○ |
| Processability (absence of strand drip) | ○ | ○ | ○ | ○ | ○ | ○ |
| Delamination, visual inspection | ○ | ○ | ○ | ○ | ○ | ○ |
| Ejection force (kgf) | 149 | 108 | 99 | 108 | 111 | 124 |
| Relative ejection force vs. C. Ex. 1 (%) | 100 | 72 | 67 | 73 | 74 | 83 |
| Silicone domain length (nm) | N/A* | N/A | 308 | N/A | N/A | N/A |
| Volatile silicone at 125° C. (ppm) | N/A | N/A | <10 | <10 | N/A | N/A |

| | Ex. 6 | Ex. 7 | Ex. 8 | C. Ex. 2 | C. Ex. 3 | C. Ex. 4 |
|---|---|---|---|---|---|---|
| COMPOSITIONS | | | | | | |
| PPE 1 | 0 | 0 | 0 | 0 | 0 | 0 |
| PPE 2 | 56.64 | 56.64 | 56.64 | 52.00 | 52.00 | 52.00 |
| HIPS | 25.23 | 25.73 | 21.23 | 33.50 | 33.50 | 33.50 |
| SBS | 3.0 | 3.0 | 3.0 | 0 | 0 | 0 |
| TSAN | 0.12 | 0.12 | 0.12 | 0 | 0 | 0 |
| Polyolefin wax | 0 | 0 | 0 | 0 | 0 | 0 |
| LLDPE | 0 | 0 | 0 | 1.5 | 0 | 0 |
| PETS | 0 | 0 | 0 | 0 | 1.5 | 0 |
| PEAS | 0 | 0 | 0 | 0 | 0 | 1.5 |
| P1D | 0 | 0 | 0 | 0 | 0 | 0 |
| PDMS MB 1 | 0 | 0.5 | 5.0 | 0 | 0 | 0 |
| PDMS MB 2 | 1.0 | 0 | 0 | 0 | 0 | 0 |
| PDMS MB 3 | 0 | 0 | 0 | 0 | 0 | 0 |
| PDMS 4 | 0 | 0 | 0 | 0 | 0 | 0 |
| PDMS 5 | 0 | 0 | 0 | 0 | 0 | 0 |
| PDMS 6 | 0 | 0 | 0 | 0 | 0 | 0 |
| PDMS 7 | 0 | 0 | 0 | 0 | 0 | 0 |
| PDMS 8 | 0 | 0 | 0 | 0 | 0 | 0 |
| PMPS | 0 | 0 | 0 | 0 | 0 | 0 |
| PTFE | 0 | 0 | 0 | 0 | 0 | 0 |
| Phosphite | 0.08 | 0.08 | 0.1 | 0 | 0 | 0 |
| MgO | 0.12 | 0.12 | 0.1 | 0 | 0 | 0 |
| ZnS | 0.12 | 0.12 | 0.1 | 0 | 0 | 0 |
| FR 1 | 0 | 13.69 | 13.69 | 13.0 | 13.0 | 13.0 |
| FR 2 | 13.69 | 0 | 0 | 0 | 0 | 0 |
| PDOS content, XRF (wt %) | 0.5 | 0.21 | 2.5 | N/A | N/A | N/A |
| PDOS content, calc. (wt %) | 0.6 | 0.25 | 2.5 | N/A | N/A | N/A |
| PROPERTIES | | | | | | |
| Handling (Blending and feeding capability) | ○ | ○ | ○ | ○ | ○ | ○ |
| Processability (absence of strand drip) | ○ | ○ | ○ | ○ | ○ | ○ |
| Delamination, visual inspection | ○ | ○ | X | ○ | ○ | ○ |
| Ejection force (kgf) | 127 | 148 | 105 | 139 | 144 | 123 |
| Relative ejection force vs. C. Ex. 1 (%) | 85 | 99 | 71 | 93 | 97 | 82 |
| Silicone domain length (nm) | N/A | N/A | N/A | N/A | N/A | N/A |
| Volatile silicone at 125° C. (ppm) | N/A | N/A | <10 | N/A | N/A | N/A |

| | C. Ex. 5 | C. Ex. 6 | C. Ex. 7 | C. Ex. 8 | C. Ex. 9 | C. Ex. 10 |
|---|---|---|---|---|---|---|
| COMPOSITIONS | | | | | | |
| PPE 1 | 0 | 0 | 0 | 0 | 0 | 0 |
| PPE 2 | 52.00 | 58.00 | 52.00 | 52.00 | 52.00 | 52.00 |
| HIPS | 33.50 | 24.73 | 33.50 | 35.00 | 33.50 | 33.50 |
| SBS | 0 | 1.64 | 0 | 0 | 0 | 0 |
| TSAN | 0 | 0.12 | 0 | 0 | 0 | 0 |
| Polyolefin wax | 0 | 0 | 0 | 0 | 0 | 0 |
| LLDPE | 0 | 0 | 0 | 0 | 0 | 0 |
| PETS | 0 | 0 | 0 | 0 | 0 | 0 |
| PEAS | 0 | 0 | 0 | 0 | 0 | 0 |
| P1D | 1.5 | 0 | 0 | 0 | 0 | 0 |
| PDMS MB 1 | 0 | 0 | 0 | 0 | 0 | 0 |
| PDMS MB 2 | 0 | 0 | 0 | 0 | 0 | 0 |
| PDMS MB 3 | 0 | 0 | 0 | 0 | 0 | 0 |
| PDMS 4 | 0 | 0 | 0 | 0 | 1.5 | 0 |
| PDMS 5 | 0 | 0 | 0 | 0 | 0 | 1.5 |
| PDMS 6 | 0 | 0 | 0 | 0 | 0 | 0 |
| PDMS 7 | 0 | 0 | 0 | 0 | 0 | 0 |
| PDMS 8 | 0 | 0 | 0 | 0 | 0 | 0 |
| PMPS | 0 | 0 | 1.5 | 0 | 0 | 0 |

TABLE 2-continued

| | | | | | | |
|---|---|---|---|---|---|---|
| PTFE | 0 | 1.5 | 0 | 0 | 0 | 0 |
| Phosphite | 0 | 0.08 | 0 | 0 | 0 | 0 |
| MgO | 0 | 0.12 | 0 | 0 | 0 | 0 |
| ZnS | 0 | 0.12 | 0 | 0 | 0 | 0 |
| FR 1 | 13.0 | 13.69 | 13.0 | 13.0 | 13.0 | 13.0 |
| FR 2 | 0 | 0 | 0 | 0 | 0 | 0 |
| PDOS content, XRF (wt %) | N/A | N/A | 1.6 | 0 | 1.9 | 1.5 |
| PDOS content, calc. (wt %) | N/A | N/A | 1.5 | 0 | 1.5 | 1.5 |
| PROPERTIES | | | | | | |
| Handling (Blending and feeding capability) | ○ | ○ | ○ | ○ | ○ | ○ |
| Processability (absence of strand drip) | ○ | X | ○ | ○ | ○ | ○ |
| Delamination, visual inspection | ○ | ○ | ○ | ○ | ○ | ○ |
| Ejection force (kgf) | 139 | N/A | 167 | 192 | 135 | 134 |
| Relative ejection force vs. C. Ex. 1 (%) | 93 | N/A | 112 | 129 | 91 | 90 |
| Silicone domain length (nm) | N/A | N/A | 188 | N/D** | 258 | 192 |
| Volatile silicone at 125° C. (ppm) | N/A | N/A | N/D | N/D | N/D | N/D |

| | C. Ex. 11 | Ex. 9 | Ex. 10 | Ex. 11 | Ex. 12 |
|---|---|---|---|---|---|
| COMPOSITIONS | | | | | |
| PPE 1 | 0 | 0 | 0 | 0 | 0 |
| PPE 2 | 52.00 | 52.00 | 52.00 | 16.80 | 67.20 |
| HIPS | 33.50 | 33.50 | 33.50 | 67.20 | 16.80 |
| SBS | 0 | 0 | 0 | 0 | 0 |
| TSAN | 0 | 0 | 0 | 0 | 0 |
| Polyolefin wax | 0 | 0 | 0 | 0 | 0 |
| LLDPE | 0 | 0 | 0 | 0 | 0 |
| PETS | 0 | 0 | 0 | 0 | 0 |
| PEAS | 0 | 0 | 0 | 0 | 0 |
| P1D | 0 | 0 | 0 | 0 | 0 |
| PDMS MB 1 | 0 | 0 | 0 | 3 | 3 |
| PDMS MB 2 | 0 | 0 | 0 | 0 | 0 |
| PDMS MB 3 | 0 | 0 | 0 | 0 | 0 |
| PDMS 4 | 0 | 0 | 0 | 0 | 0 |
| PDMS 5 | 0 | 0 | 0 | 0 | 0 |
| PDMS 6 | 1.5 | 0 | 0 | 0 | 0 |
| PDMS 7 | 0 | 1.5 | 0 | 0 | 0 |
| PDMS 8 | 0 | 0 | 1.5 | 0 | 0 |
| PMPS | 0 | 0 | 0 | 0 | 0 |
| PTFE | 0 | 0 | 0 | 0 | 0 |
| Phosphite | 0 | 0 | 0 | 0 | 0 |
| MgO | 0 | 0 | 0 | 0 | 0 |
| ZnS | 0 | 0 | 0 | 0 | 0 |
| FR 1 | 13.0 | 13.0 | 13.0 | 13.0 | 13.0 |
| FR 2 | 0 | 0 | 0 | 0 | 0 |
| PDOS content, XRF (wt %) | 1.6 | 1.4 | 2.1 | 2.6 | 2.2 |
| PDOS content, calc. (wt %) | 1.5 | 1.5 | 1.5 | 1.5 | 1.5 |
| PROPERTIES | | | | | |
| Handling (Blending and feeding capability) | X | X | X | ○ | ○ |
| Processability (absence of strand drip) | ○ | ○ | ○ | ○ | ○ |
| Delamination, visual inspection | ○ | ○ | ○ | ○ | ○ |
| Ejection force (kgf) | 122 | 103 | 109 | 101 | 103 |
| Relative ejection force vs. C. Ex. 1 (%) | 82 | 69 | 70 | 68 | 69 |
| Silicone domain length (nm) | 290 | 275 | N/A | N/A | N/A |
| Volatile silicone at 125° C. (ppm) | N/D | N/D | <10 | N/A | N/A |

| | C. Ex. 12 | C. Ex. 13 | Ex. 13 | Ex. 14 |
|---|---|---|---|---|
| COMPOSITIONS | | | | |
| PPE 1 | 0 | 0 | 0 | 0 |
| PPE 2 | 60 | 60 | 52 | 56.64 |
| HIPS | 24 | 24 | 33.4 | 25.2 |
| SBS | 0 | 0 | 0 | 3 |
| TSAN | 0 | 0 | 0 | 0.15 |
| Polyolefin wax | 3 | 3 | 0 | 0 |
| LLDPE | 0 | 0 | 0 | 0 |
| PETS | 0 | 0 | 0 | 0 |
| PEAS | 0 | 0 | 0 | 0 |
| P1D | 0 | 0 | 0 | 0 |
| PDMS MB 1 | 0 | 1.6 | 1.6 | 0 |

TABLE 2-continued

|  | | | | |
|---|---|---|---|---|
| PDMS MB 2 | 0 | 0 | 0 | 1.0 |
| PDMS MB 3 | 0 | 0 | 0 | 0 |
| PDMS 4 | 0 | 0 | 0 | 0 |
| PDMS 5 | 0 | 0 | 0 | 0 |
| PDMS 6 | 0 | 0 | 0 | 0 |
| PDMS 7 | 0 | 0 | 0 | 0 |
| PDMS 8 | 0 | 0 | 0 | 0 |
| PMPS | 0 | 0 | 0 | 0 |
| PTFE | 0 | 0 | 0 | 0 |
| Phosphite | 0 | 0 | 0 | 0.08 |
| MgO | 0 | 0 | 0 | 0.12 |
| ZnS | 0 | 0 | 0 | 0.12 |
| FR 1 | 13 | 13 | 13 | 13.69 |
| FR 2 | 0 | 0 | 0 | 0 |
| PDOS content, XRF (wt %) | N/A | N/A | N/A | N/A |
| PDOS content, calc. (wt %) | N/A | N/A | N/A | N/A |
| PROPERTIES | | | | |
| Handling (Blending and feeding capability) | ○ | ○ | ○ | ○ |
| Processability (absence of strand drip) | X | X | ○ | ○ |
| Delamination, visual inspection | ○ | ○ | ○ | ○ |
| Ejection force (kgf) | 125 | 113 | N/A | 119 |
| Relative ejection force vs. C. Ex. 1 (%) | 84 | 76 | N/A | 80 |
| Silicone domain length (nm) | N/A | N/A | N/A | 269 |
| Volatile silicone at 125° C. (ppm) | N/A | N/A | N/A | N/A |

*"N/A" means that the property was not determined
***"N/D" means that the property was not detected

The invention claimed is:

1. A composition comprising, based on the total weight of the composition:
   15 to 70 weight percent of a poly(phenylene ether);
   15 to 70 weight percent of a rubber-modified polystyrene comprising polystyrene and polybutadiene;
   10 to 20 weight percent of a flame retardant comprising an organophosphate ester; and
   0.2 to 4 weight percent of a mold release agent comprising a polydiorganosiloxane having a kinematic viscosity of 20,000 to 5,000,000 centistokes at 23° C., measured at 23° C. according to ISO 2555:1989;
   wherein the composition excludes polyolefin waxes.

2. The composition of claim 1, wherein the poly(phenylene ether) is a poly(2,6-dimethyl-1,4-phenylene ether) having an intrinsic viscosity of 0.3 to 0.5 deciliter per gram as measured in chloroform at 25° C.

3. The composition of claim 1, wherein the rubber-modified polystyrene comprises 80 to 96 weight percent polystyrene, and 4 to 20 weight percent polybutadiene, based on the weight of the rubber-modified polystyrene.

4. The composition of claim 1, wherein the sum of the poly(phenylene ether) weight percent and the rubber-modified polystyrene weight percent is 75 to 89.6 weight percent.

5. The composition of claim 1, wherein the organophosphate ester is selected from the group consisting of tris((C$_1$-C$_6$-alkyl)phenyl) phosphates, resorcinol bis(diphenyl phosphate), bisphenol A bis(diphenyl phosphate), triphenyl phosphate, t-butylphenyl diphenyl phosphates, bis(t-butylphenyl) phenyl phosphates, and combinations thereof.

6. The composition of claim 1, wherein the organophosphate ester is selected from the group consisting of resorcinol bis(diphenyl phosphate), bisphenol A bis(diphenyl phosphate), and combinations thereof.

7. The composition of any one of claims 1-6, wherein the flame retardant consists of the organophosphate ester.

8. The composition of claim 1, wherein the polydiorganosiloxane comprises diorganosiloxane repeat units having the structure

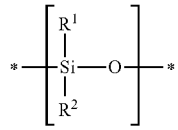

wherein each occurrence of $R^1$ and $R^2$ is independently $C_1$-$C_{12}$ hydrocarbyl.

9. The composition of claim 1, wherein the polydiorganosiloxane is selected from the group consisting of polydimethylsiloxanes, trimethylsilyl-terminated polydimethylsiloxanes, vinyldimethylsilyl-terminated polydimethylsiloxanes, epoxycyclohexyldimethylsilyl-terminated polydimethylsiloxanes, glycidoxypropyldimethylsilyl-terminated polydimethylsiloxanes, p-styryldimethylsilyl-terminated polydimethylsiloxanes, methacryloxypropyldimethylsilyl-terminated polydimethylsiloxanes, acryloxydimethylsilyl-terminated polydimethylsiloxanes, aminopropyldimethylsilyl-terminated polydimethylsiloxanes, 3-isocyanatopropyldimethylsilyl-terminated polydimethylsiloxanes, 3-mercaptopropyldimethylsilyl-terminated polydimethylsiloxanes, 3-ureidopropyldimethylsilyl-terminated polydimethylsiloxanes, ethyldimethylsilyl-terminated polydimethylsiloxanes, propyldimethylsilyl-terminated polydimethylsiloxanes, hexyldimethylsilyl-terminated polydimethylsiloxanes, octyldimethylsilyl-terminated polydimethylsiloxanes, decyldimethylsilyl-terminated polydimethylsiloxanes, phenyldimethylsilyl-terminated polydimethylsiloxanes, and combinations thereof.

10. The composition of claim 1, comprising
   a continuous phase comprising the poly(phenylene ether), the rubber-modified polystyrene, and the organophosphate ester; and a disperse phase comprising the polydiorganosiloxane;
wherein the disperse phase comprises disperse phase domains characterized by a domain length of 150 to 500 nanometers.

11. The composition of claim 1,
wherein the poly(phenylene ether) is a poly(2,6-dimethyl-1,4-phenylene ether) having an intrinsic viscosity of 0.34 to 0.46 deciliter per gram as measured in chloroform at 25° C.;
wherein the rubber-modified polystyrene comprises 80 to 96 weight percent polystyrene, and 4 to 20 weight percent polybutadiene, based on the weight of the rubber-modified polystyrene;
wherein the organophosphate ester comprises resorcinol bis(diphenyl phosphate), bisphenol A bis(diphenyl phosphate), or a combination thereof;
wherein the polydiorganosiloxane is a polydimethylsiloxane having a kinematic viscosity of 1,000,000 to 5,000,000 centistokes at 23° C.; and
wherein the composition comprises
47 to 67 weight percent of the poly(phenylene ether),
20 to 30 weight percent of the rubber-modified polystyrene,
8 to 18 weight percent of the organophosphate ester, and
0.3 to 2 weight percent of the polydiorganosiloxane.

12. A method of forming a composition, the method comprising:
melt-blending components comprising, based on the total weight of the composition,
15 to 70 weight percent of a poly(phenylene ether),
15 to 70 weight percent of a rubber-modified polystyrene comprising polystyrene and polybutadiene,
10 to 20 weight percent of a flame retardant comprising an organophosphate ester, and
0.2 to 4 weight percent of a mold release agent comprising a polydiorganosiloxane having a kinematic viscosity of 20,000 to 5,000,000 centistokes at 23° C.
to form the composition;
wherein the polydiorganosiloxane prior to melt blending is in the form of a masterbatch in polystyrene, rubber-modified polystyrene, silica, or a combination thereof;
wherein the masterbatch is a solid at 23° C. and one atmosphere; and
wherein the composition excludes polyolefin waxes.

13. The method of claim 12, wherein the composition comprises
a continuous phase comprising the poly(phenylene ether), the rubber-modified polystyrene, and the organophosphate ester; and
a disperse phase comprising the polydiorganosiloxane;
wherein the disperse phase comprises disperse phase domains characterized by a domain length of 150 to 500 nanometers.

14. The method of claim 12,
wherein the poly(phenylene ether) is a poly(2,6-dimethyl-1,4-phenylene ether) having an intrinsic viscosity of 0.34 to 0.46 deciliter per gram as measured in chloroform at 25° C.;
wherein the rubber-modified polystyrene comprises 80 to 96 weight percent polystyrene, and 4 to 20 weight percent polybutadiene, based on the weight of the rubber-modified polystyrene;
wherein the organophosphate ester comprises resorcinol bis(diphenyl phosphate), bisphenol A bis(diphenyl phosphate), or a combination thereof;
wherein the polydiorganosiloxane is a polydimethylsiloxane having a kinematic viscosity of 1,000,000 to 5,000,000 centistokes at 23° C.;
wherein the polydiorganosiloxane prior to melt blending is in the form of a masterbatch in rubber-modified polystyrene; and
wherein the composition comprises
47 to 67 weight percent of the poly(phenylene ether),
20 to 30 weight percent of the rubber-modified polystyrene,
8 to 18 weight percent of the organophosphate ester, and
0.3 to 2 weight percent of the polydiorganosiloxane.

15. An article comprising a composition comprising, based on the total weight of the composition:
15 to 70 weight percent of a poly(phenylene ether);
15 to 70 weight percent of a rubber-modified polystyrene comprising polystyrene and polybutadiene;
10 to 20 weight percent of a flame retardant comprising an organophosphate ester; and
0.2 to 4 weight percent of a mold release agent comprising a polydiorganosiloxane having a kinematic viscosity of 20,000 to 5,000,000 centistokes at 23° C.;
wherein the composition excludes polyolefin waxes.

16. The article of claim 15, wherein the composition comprises
a continuous phase comprising the poly(phenylene ether), the rubber-modified polystyrene, and the organophosphate ester; and
a disperse phase comprising the polydiorganosiloxane;
wherein the disperse phase comprises disperse phase domains characterized by a domain length of 150 to 500 nanometers.

17. The article of claim 15,
wherein the poly(phenylene ether) is a poly(2,6-dimethyl-1,4-phenylene ether) having an intrinsic viscosity of 0.34 to 0.46 deciliter per gram as measured in chloroform at 25° C.;
wherein the rubber-modified polystyrene comprises 80 to 96 weight percent polystyrene, and 4 to 20 weight percent polybutadiene, based on the weight of the rubber-modified polystyrene;
wherein the organophosphate ester comprises resorcinol bis(diphenyl phosphate), bisphenol A bis(diphenyl phosphate), or a combination thereof;
wherein the polydiorganosiloxane is a polydimethylsiloxane having a kinematic viscosity of 1,000,000 to 5,000,000 centistokes at 23° C.; and
wherein the composition comprises
47 to 67 weight percent of the poly(phenylene ether),
20 to 30 weight percent of the rubber-modified polystyrene,
8 to 18 weight percent of the organophosphate ester, and
0.3 to 2 weight percent of the polydiorganosiloxane.

18. The article of claim 15, comprising a cylindrical or conical portion characterized by a length of at least 10 millimeters and a draft angle of 0 to 0.5 degree.

19. The article of claim 15, wherein the article is a battery holder for a back-up power supply.

* * * * *